(12) United States Patent
Danilov (10) Patent No.: US 8,365,967 B1
(45) Date of Patent: Feb. 5, 2013

(54) PRESSURE-ACTIVATED VALVE

(76) Inventor: Dmitriy Danilov, Toronto (CA)

(*) Notice: Subject to any disclaimer, the term of this patent is extended or adjusted under 35 U.S.C. 154(b) by 0 days.

(21) Appl. No.: 13/495,815

(22) Filed: Jun. 13, 2012

Related U.S. Application Data (60) Provisional application No. 61/607,193, filed on Mar. 6, 2012.

(51) Int. Cl.
*B65D 5/72* (2006.01)
*B65D 25/40* (2006.01)
*B65D 35/38* (2006.01)
*G05D 7/01* (2006.01)
*F16L 9/00* (2006.01)
*F16L 11/00* (2006.01)
*F16K 15/14* (2006.01)

(52) U.S. Cl. .......... 222/494; 137/847; 137/849; 138/45; 138/46; 138/109

(58) Field of Classification Search .................. 222/490, 222/491, 494, 212, 213; 137/846, 847, 849, 137/527, 527.6; 138/109, 45, 46
See application file for complete search history.

(56) References Cited

U.S. PATENT DOCUMENTS

| | | | |
|---|---|---|---|
| 1,709,948 A | 4/1929 | Proctor | |
| 1,825,553 A | 9/1931 | Smith | |
| 2,078,149 A | 4/1937 | Lutz | |
| 2,175,052 A | 10/1939 | Boll | |
| 2,193,517 A | 3/1940 | Lindstrom | |
| 2,281,651 A | 5/1942 | Wolcott | |
| 2,756,773 A * | 7/1956 | Bauerlein | 137/895 |
| 2,818,089 A * | 12/1957 | Mayhill | 141/67 |
| 3,206,079 A | 9/1965 | Mancusi, Jr. | |
| 3,236,417 A | 2/1966 | Linton | |
| 3,548,417 A * | 12/1970 | Kischer et al. | 623/2.17 |
| 3,752,178 A | 8/1973 | Grove et al. | |
| 3,843,028 A | 10/1974 | Whitehead | |
| 3,981,419 A | 9/1976 | Nilson | |
| 4,057,177 A | 11/1977 | Laauwe | |
| 4,226,342 A | 10/1980 | Laauwe | |
| 4,281,779 A | 8/1981 | Shepard | |
| 4,289,166 A * | 9/1981 | Haines | 137/846 |
| 4,364,127 A * | 12/1982 | Pierce et al. | 623/2.19 |
| 4,420,101 A | 12/1983 | O'Neill | |
| 4,474,314 A | 10/1984 | Roggenburg, Jr. | |
| 4,492,253 A * | 1/1985 | Raftis | 137/849 |

(Continued)

FOREIGN PATENT DOCUMENTS

| EP | 0409594 | 1/1991 |
|---|---|---|
| EP | 0586778 | 3/1994 |

(Continued)

*Primary Examiner* — Kevin P Shaver
*Assistant Examiner* — Vishal Pancholi
(74) *Attorney, Agent, or Firm* — Kagan Binder, PLLC (57) ABSTRACT

A valve formed from a frustoconical piece of foldable material, having folds extending from a closable end towards the other end that connects to a container of liquid, each fold having an inner crease extending into the interior region of the nozzle. The valve has a biasing mechanism that may include a spiral spring encircling a nozzle to bias the inner creases inward to cause them to abut each other at the closable end so that the valve is maintained in a closed position. When liquid is forced into the interior region under sufficient pressure it causes the nozzle to move from the closed position to an open position so liquid flows from the interior region out the closable end of the nozzle, and when the pressure on the liquid is removed, the biasing mechanism causes the nozzle to move back to the closed position.

18 Claims, 8 Drawing Sheets

U.S. PATENT DOCUMENTS

| | | | | |
|---|---|---|---|---|
| 4,728,006 | A | 3/1988 | Drobish et al. | |
| 4,847,988 | A | 7/1989 | Eitzinger | |
| 4,872,596 | A | 10/1989 | Corsette | |
| 4,903,868 | A | 2/1990 | Ichihara et al. | |
| 4,905,901 | A | 3/1990 | Johnson | |
| 4,969,581 | A | 11/1990 | Seifert et al. | |
| 5,033,655 | A | 7/1991 | Brown | |
| 5,115,950 | A | 5/1992 | Rohr | |
| 5,271,531 | A | 12/1993 | Rohr | |
| 5,307,955 | A | 5/1994 | Viegas | |
| 5,356,038 | A | 10/1994 | Banks | |
| 5,447,255 | A | 9/1995 | Smedley | |
| 5,456,294 | A * | 10/1995 | Tsao et al. | 141/1 |
| 5,667,107 | A | 9/1997 | Lindsey | |
| 5,911,344 | A | 6/1999 | Kieras | |
| 6,068,025 | A * | 5/2000 | Schlecht | 138/109 |
| 6,199,725 | B1 * | 3/2001 | Garibaldi | 222/207 |
| 6,253,958 | B1 | 7/2001 | Coletti | |
| 6,382,255 | B2 * | 5/2002 | McFarland | 137/849 |
| 6,554,698 | B2 * | 4/2003 | Kranzdorf et al. | 454/184 |
| 7,510,676 | B2 * | 3/2009 | Eimer | 264/295 |
| 8,087,547 | B1 | 1/2012 | Lindsey | |
| 2005/0109966 | A1 | 5/2005 | Berghoff | |
| 2006/0037976 | A1 * | 2/2006 | Eimer | 222/491 |
| 2008/0061089 | A1 * | 3/2008 | Wellman | 222/494 |

FOREIGN PATENT DOCUMENTS

| | | |
|---|---|---|
| WO | WO9810251 | 3/1998 |

* cited by examiner

Fig. 24d

PRESSURE-ACTIVATED VALVE

PRIORITY

This non provisional application claims the benefit of provisional application having Ser. No. 61/607,193, filed on Mar. 6, 2012, and entitled "PRESSURE-ACTIVATED VALVE, which application is incorporated herein by reference in its entirety.

FIELD OF THE INVENTION

The present invention relates generally to valves for controlling the flow of liquids, and more particularly to pressure-activated valves for controlling the flow of liquids dispensed from a container.

BACKGROUND OF THE INVENTION

Liquids are often sold in containers with lids, caps or valves that allow a user to remove some of the liquid contents of the container through an opening, but retain the remainder of the contents in the container for future use. Such retention generally requires that the container provide a mechanism to re-seal the opening to prevent the liquid from escaping through the opening, either by spillage or evaporation, and to prevent spoilage of the liquid through exposure to the outside environment. Examples of such liquids include toothpaste, cosmetic cream, shampoo, glue, washing detergents, and various food items, such as tomato paste, peanut butter, chocolate paste, and icing.

Re-sealing of such containers generally requires the replacement of a cap that covers a dispensing nozzle having an opening through which the liquid passes. Such approaches are undesirable because of the need for a user to manipulate the cap to re-seal the opening.

Some approaches have been devised to provide a self-sealing nozzle that allows a user to squeeze the container to pressurize the liquid contained therein so that the liquid applies pressure to the nozzle, causing it to open and allow the liquid to pass though the opening, and then to re-seal the opening automatically when the pressure is removed. While such a capability is highly desirable to users, existing devices to provide such a capability have been generally unsuccessful for various reasons such as complexity, cost, cleanliness, and inadequate isolation of the liquid in the container from the outside environment.

SUMMARY OF THE INVENTION

The present invention provides a pressure-activated valve for dispensing a liquid, the valve comprising
 (a) a dispensing nozzle having an interior region, the nozzle being formed from a frustoconical piece of foldable material having proximal and distal ends, each end having a centre, the nozzle having a longitudinal axis passing through the centre of the proximal and distal ends, the nozzle comprising a plurality of folds extending from the distal end towards the proximal end, each fold having an inner crease, the nozzle having a closed position in which the inner creases abut each other at the distal end so that the liquid cannot pass through the distal end from the interior region, and having open positions in which the inner creases at the distal end are spaced apart from each other to allow the liquid to pass through the distal end from the interior region,
 (b) a biasing mechanism to bias the nozzle into the closed position, and
 (c) a container attachment mechanism attached to the proximal end of the nozzle for attaching the nozzle to a container containing the liquid so that the liquid can pass from the container into the interior region,
wherein, when the liquid is forced into the interior region under sufficient pressure it causes the nozzle to move from the closed position to one of the open positions so that the liquid flows from the interior region out through the distal end of the nozzle, and when the pressure on the liquid is removed, the biasing mechanism causes the nozzle to move back to the closed position.

The proximal end of the nozzle may form a circle.

The nozzle may have at least 8 folds. The nozzle may have at least 16 folds. The nozzle may have at least 24 folds. The nozzle may have no more than 32 folds. The nozzle may have no more than 16 folds.

Each fold may include two outer creases, where each outer crease is shared with an adjacent fold, the portion of the nozzle situated between each crease being a panel, so that two panels are adjacent to each outer crease.

The widths of the panels at each longitudinal point, the width being the distance from the inner crease to the outer crease in a plane parallel to the proximal end of the nozzle passing through the point on the longitudinal axis, may be equal.

Each crease may be sharp so that each crease defines a line extending from the distal end of the nozzle to the proximal end of the nozzle, and the panels may be flat and pivot around the creases when the nozzle moves between open and closed positions, and the two panels adjacent to each outer crease abut each other at the distal end of the nozzle when the nozzle is in the closed position. The lines defined by the creases may be straight. Alternatively, the lines defined by the creases may be curved in the same manner.

The biasing mechanism may be a helical spring adapted to pass through one or more openings in each panel, the openings being arranged helically. The spring may be disposed within a helical tube, the tube being adapted to pass through the openings in the panels, where the tube engages each panel at the one or more openings to form a liquid-tight seal, preventing the liquid in the interior region from passing though the openings. The tube may be made of the same material as the nozzle.

The biasing mechanism may include a base portion, attached to the proximal end of the nozzle, and a plurality of fingers extending from the base portion, the fingers arranged so that each finger runs along the outside of one of the inner creases to bias the inner crease towards the longitudinal axis, and one finger runs along each inner crease. The base portion and fingers of the biasing mechanism may be integrally formed. The lines defined by the creases may be curved in the same manner.

DETAILED DESCRIPTION OF THE INVENTION

The term frustoconical as used herein refers to the shape of a frustum, by which is meant the shape consisting of a cone, excluding the portion above a distal plane parallel to, and spaced apart from, the base of the cone that defines a proximal plane. As used herein, a frustum also includes a cylinder. A frustoconical piece of material is a solid object having inner and outer surfaces, each of which defines a frustum extending between the same proximal and distal planes. Such a frustoconical piece of material defines an interior region that includes the space inside the frustum defined by its inner surface between the proximal plane and the distal plane.

Figure 1:
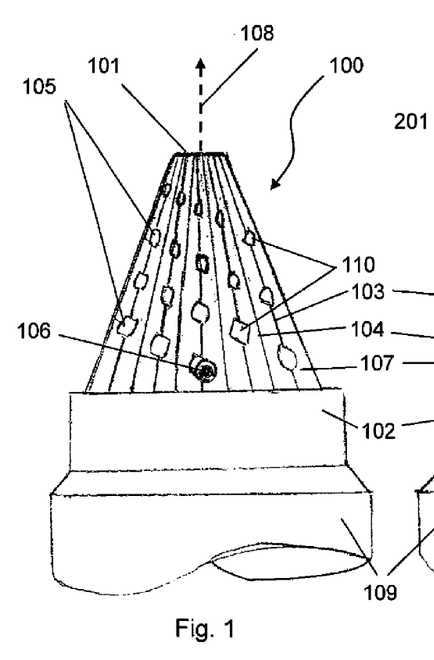
FIG. 1 is a side view of an embodiment of a pressure-activated valve in a closed position.
Figure 2:
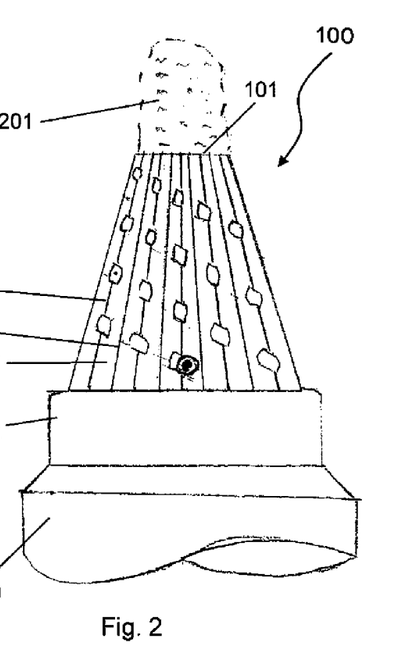
FIG. 2 is a side view of the pressure-activated valve depicted in FIG. 1 in an open position.
Figure 3:
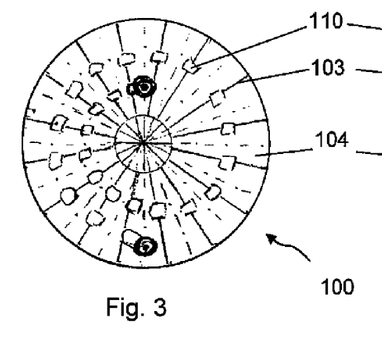
FIG. 3 is a top view of a pressure-activated valve in a closed position similar to the valve depicted in FIG. 1.
Figure 4:
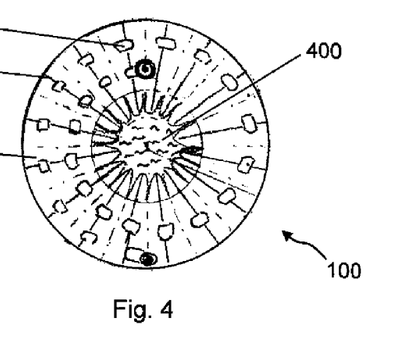
FIG. 4 is a top view of a pressure-activated valve in an open position similar to the valve depicted in FIG. 2.

One embodiment of the invention is shown in FIGS. 1 and 3 in a closed position and a similar embodiment is shown in FIGS. 2 and 4 in an open position. These embodiments include a nozzle 100 constructed from a frustoconical piece of foldable material having a base, or proximal end, attached to, or integrally formed with, a container attachment mechanism 102, and having a distal end 101. The proximal end of the depicted embodiment is circular as is the distal end, prior to being folded. The nozzle 100 has a longitudinal axis 108 extending through the centres of the proximal and distal ends.

A plurality of folds extending from the distal end to the proximal end are made in the nozzle material. The folds include a number of inner creases 103 that extend into the interior region defined by the nozzle 100 and an equal total number of outer creases 104. In the depicted embodiment in FIG. 1, the creases are sharp so that each crease defines a line extending from the distal end 101 of the nozzle to the proximal end of the nozzle, with the outer creases 104 being further from the longitudinal axis 108 than the inner creases 103. In this embodiment the defined lines are all straight and the inner creases 103 all lie on an inner conceptual cone whose axis coincides with the longitudinal axis 108, and the outer creases 104 all lie on an outer conceptual cone whose axis also coincides with the longitudinal axis 108 but which has a larger radius at each point along the longitudinal axis 108 than does the inner cone.

Each fold includes one inner crease and two outer creases where each outer crease is shared between adjacent folds, and each fold includes two panels 107. Each panel 107 consists of the nozzle material situated between each pair of adjacent inner and outer creases. The panels 107 are generally flat and designed to rotate about the creases.

The proximal end of the nozzle is rigidly attached to the container attachment mechanism 102, which is in turn rigidly attached to the container 109 that contains a liquid. This prevents any movement of the nozzle 100 at the proximal end relative to the container 109 during the use of the container to dispense liquid, but the distal end 101 of the nozzle 100 is not rigidly constrained so that by exerting pressure on the inner creases 103 perpendicular to and towards the longitudinal axis 108, the nozzle 100 can be moved into, and held in, a closed position as depicted in FIG. 1. In the closed position, the inner creases 103 abut each other at the distal end 101 so that liquid cannot pass through the distal end 101 from the interior region. The nozzle 100 is biased into the closed position by a biasing mechanism that applies pressure (a force) on the inner creases 103 perpendicular to and towards the longitudinal axis 108. The biasing mechanism employed in the embodiment of FIG. 1 includes a helical tube 105 containing a helical spring where the helical tube 105 is threaded through a helical series of holes or openings in the panels 107 sized so that when the tube 105 engages the panels 107 at each opening, it forms a liquid-tight seal, preventing any liquid in the interior region from passing though the openings. The proximal end of the spring may be held in a fixed position by a plug 106 in the tube 105 that is attached to the proximal end of the spring.

Methods of manufacturing the valves will be apparent to those skilled in the art of the production of molded plastic items, for example, when the valve is made from a plastic, such as latex. For example, the openings in the panels may be made in a sheet of material prior to forming the material into a frustum as the required positions are readily calculated based on the spring design and dimensions of the nozzle. Alternatively, front and back forms may be employed with the front form corresponding to the shape of the nozzle's outer surface and the back form corresponding to the shape of the nozzle's inner surface, so that the nozzle is formed by injecting liquid plastic between the two forms. In that case, the holes may be formed, for example, by employing appropriately positioned and sized cylindrical projections extending from the back form to the front form.

The embodiment shown in FIG. 1 includes a second helical spring and tube 110, although the use of more than one spring and tube is not preferred.

Figure 11:
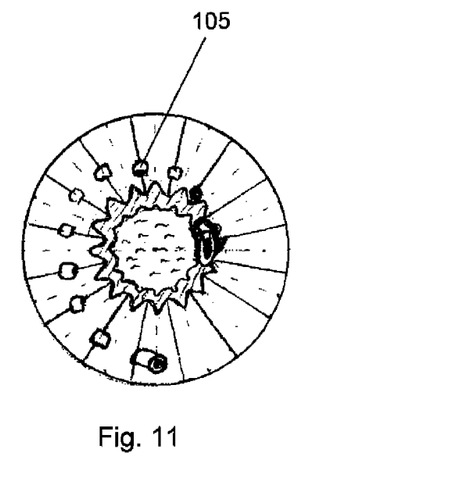
FIG. 11 is a top cross-sectional view of the pressure-activated valve depicted in FIG. 9 through the line A-A.
Figure 12:
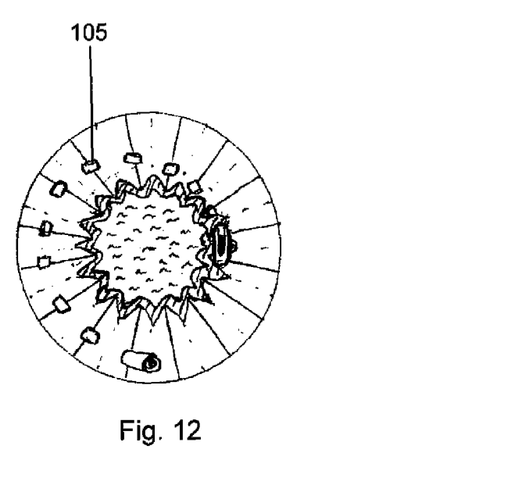
FIG. 12 is a top cross-sectional view of the pressure-activated valve depicted in FIG. 10 through the line B-B.
Figures 13A, 13B:
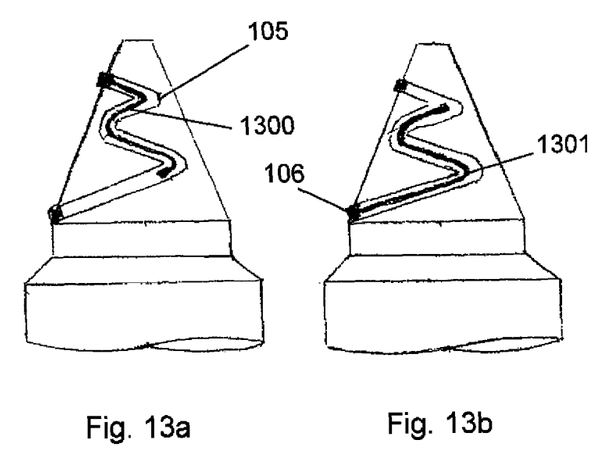
FIGS. 13a, 13b and 13c show three side views of embodiments similar to the valve depicted in FIG. 9 showing three variations of the biasing mechanism differing in the anchoring of the spring.
Figure 13C:
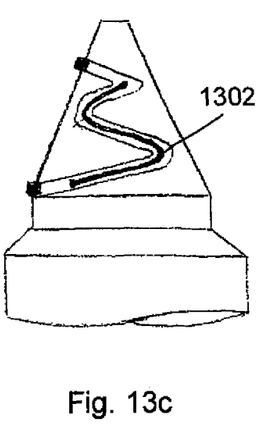

The use of a tube containing a spring as a biasing mechanism is further exemplified in FIGS. 9 to 13c. Portions 1001 of the tube passing through the panels into the interior region can also be seen in FIGS. 9 and 10. FIGS. 11 and 12 provide top cross-sectional views. FIGS. 13a, 13b and 13c show examples, respectively, where the spring 1300 (a) is anchored to a plug near the distal end of the nozzle, (b) is anchored to a plug 106 near the proximal end of the nozzle, and (c) is not anchored.

In the absence of any interior pressure, the spring applies pressure inward on the panels and thereby on the inner creases, causing the folds to close, to the extent they are free to move, and to remain closed. Since the proximal end is constrained, the folds do not move at that end; however, the distal end is unconstrained, so that the spring causes the inner creases to move inward until they abut each other at the distal end and causes each set of two panels 107 adjacent to each outer crease 104 to abut each other at the distal end, thus forming a "star" pattern, as viewed from above, with no opening from the outside to the interior region. By selecting a sufficiently strong spring, this closed position does not permit any liquid in the interior region to pass through the distal end to the outside, even if the container 109 is held upside down.

A "star pattern" refers to a polygon having a number of points that may be connected to the centre of the polygon by straight lines that only pass though the interior region of the polygon. In preferred embodiments, the star shape exhibited by the inner surface of the nozzle in any cross-section though the nozzle parallel to the base plane of the nozzle is radially symmetric with the tips of the points lying on a circle. Such cross-sections are shown in FIGS. 11 and 12.

The container 109 is generally made of a deformable material that may be squeezed by a user's fingers, causing the liquid in the container 109 to pass into the interior region of the nozzle 100 and exert pressure outwardly on the nozzle 100 away from the longitudinal axis 108. By applying sufficient pressure to overcome the biasing mechanism, the panels 107 rotate relative to the creases, creating a star-shaped opening 400 in the distal end 101 of the nozzle 100. By continuing to exert pressure when the nozzle 100 is in such as open position, the user can cause the liquid 201 to move out through the opening 400 from the interior region to the outside. The user may then use the dispensed liquid for the purpose it was obtained. When the user removes the pressure by discontinuing squeezing the container 109, the outward pressure on the nozzle is reduced so that the biasing mechanism moves the nozzle 100 back into the closed position automatically.

The biasing mechanism may be selected so that level of force applied by the biasing mechanism is sufficient to push enough of the liquid, if any, in the interior region back into the container so that the closed position is attained automatically for a particular type of liquid. For low viscosity liquids, such as water, any liquid remaining in the interior region after the user discontinues pressure will present negligible resistance to the biasing mechanism. Other liquids, such as peanut butter may require the biasing mechanism to apply significant pressure to move the liquid out of the interior region and/or compress the liquid, so that the nozzle 100 moves into the closed position when external pressure is removed.

For a liquid with a viscosity similar to water, a relatively low force biasing mechanism may be selected. For use with toothpaste, a higher force biasing mechanism may be selected, and for very viscous liquids, such as peanut butter, an even higher force biasing mechanism may be selected.

In some embodiments, the folds may extend from the distal end towards, but not all the way to, the proximal end. In some embodiments, as shown in FIGS. 23 and 24a-d, the folds, other than at and near the distal end 2301 of the nozzle 2300, may not be sharp so that rather being "V" shaped, the proximal portions of the folds may be "U" shaped. It is sufficient that the folds at and near the distal end 2301 are sharp to ensure that the distal end is sealed in the closed position. In some embodiments, the folds may be flat at the proximal end (which may form a circle), and become "U" shaped" with a depth increasing proportionally to the distance from the proximal end, until they become "V" shaped near to and at the distal end. This is demonstrated in the four partial cross sections through the valve 2300 as shown in FIGS. 24a, 24b, 24c, and 24d. The cross section near the proximal end as shown in FIG. 24d is quite smooth. Moving up to cross-section c-c shown in FIG. 24c, the folds are "U" shaped so that the inner creases 2400 and outer creases 2401 are curved. Moving closer to the distal end, as shown in FIG. 24b, the inner and outer creases 2401, 2400 become sharp.

Figure 5:
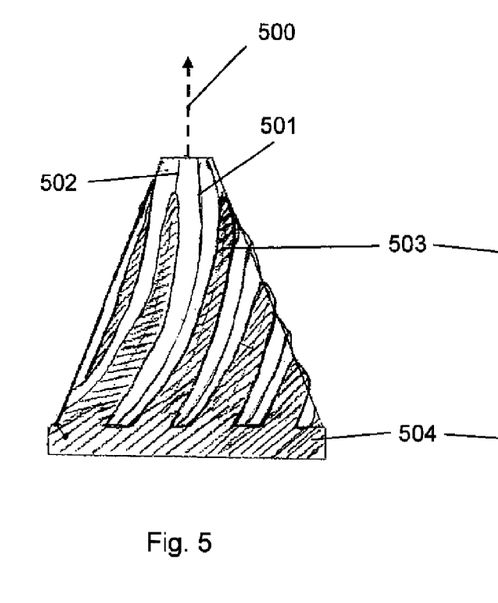
FIG. 5 is a side view of another embodiment of a pressure-activated valve in a closed position.
Figure 6:
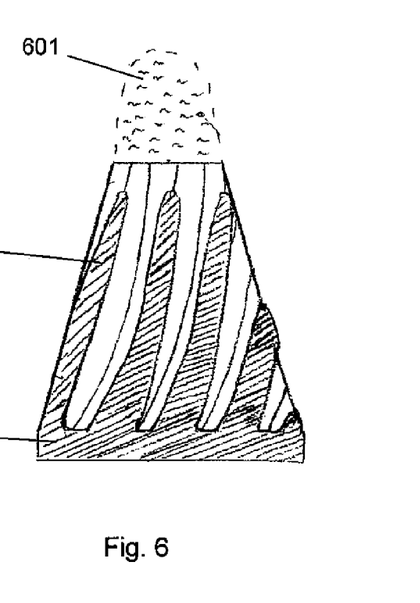
FIG. 6 is a side view of the pressure-activated valve depicted in FIG. 5 in an open position.

FIGS. 5 to 8 and 16 show an embodiment of the invention employing an alternate biasing mechanism 1603 comprising a base portion 504 attached to the nozzle near the proximal end, and a plurality of fingers 503 extending from the base portion and sized and arranged so that each finger 503 runs along the outside of one of the inner creases 502 to bias the inner crease 502 towards the longitudinal axis 500, with one finger 503 for every fold being disposed along the outside of the inner crease 502 of each fold. The fingers 503 are sufficiently thin that they permit the outer creases to pass between adjacent fingers 503 in the closed position shown in FIG. 4, and partially retract relative to the fingers 503 in an open position, as shown in FIG. 6.

Figure 16:
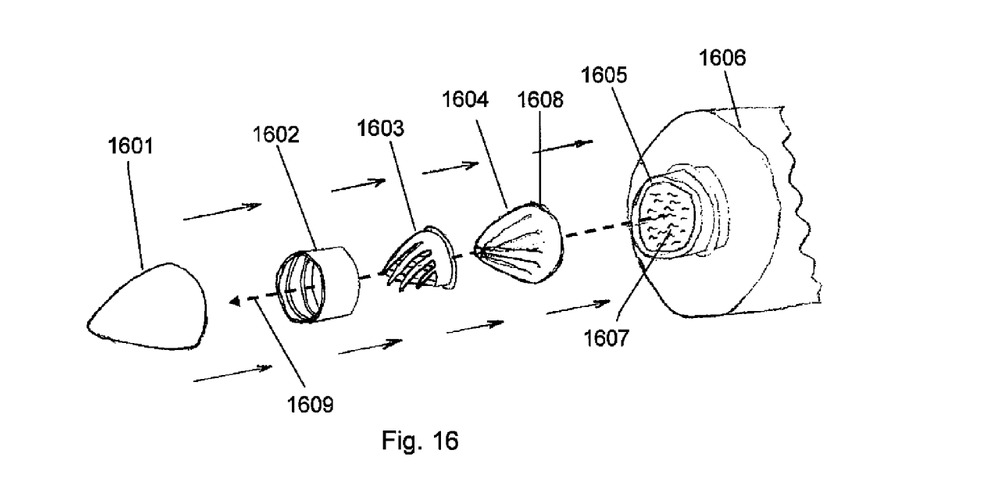
FIG. 16 shows an exploded view of a pressure-activated valve similar to the valve depicted in FIG. 5 including an outer cap and a container attachment mechanism.

The biasing mechanism 1603 may be attached to the nozzle 1604 by any suitable means, such as by friction between the base portion of the biasing mechanism 1603 and the portion of the nozzle 1604 near its proximal end 1608. Alternatively the base portion of the biasing mechanism 1603 may be bonded to the portion of the nozzle 1604 near its proximal end 1608 in a manner that aligns the fingers with the inner creases of the nozzle 1604. The biasing mechanism 1603 is preferably formed from a single piece of resilient material, although the fingers may be made of such a resilient material and attached to a base portion made of another material. In another embodiment, the base portion of the biasing mechanism 1603 may be the portion of the nozzle 1604 near its proximal end 1608 with the fingers attached thereto.

The angle of attachment to, or extension from, the base portion of the fingers is determined by angling them sufficiently that the nozzle 1604 is maintained in the closed position when there is no interior pressure on the nozzle 1604, which also depends on the material used to form the fingers. The material used to form the fingers is selected so that it provides sufficient force towards the longitudinal axis 1609, as described above, so that the nozzle 1604 will return to the closed position when any external force is removed from the liquid 1607, which depends on the viscosity of the liquid. The force must be sufficient to push any liquid 1607 in the interior region of the nozzle 1604 back into the container 1606, and/or compress the liquid 1607, so that the closed position is attained.

Figure 7:
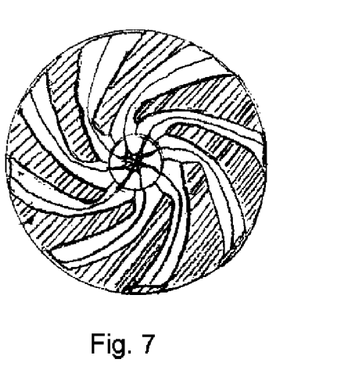
FIG. 7 is a top view of the pressure-activated valve depicted in FIG. 5 in a closed position.
Figure 8:
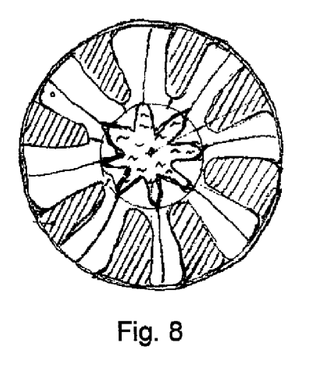
FIG. 8 is a top view of the pressure-activated valve depicted in FIG. 5 in an open position.
Figure 9:
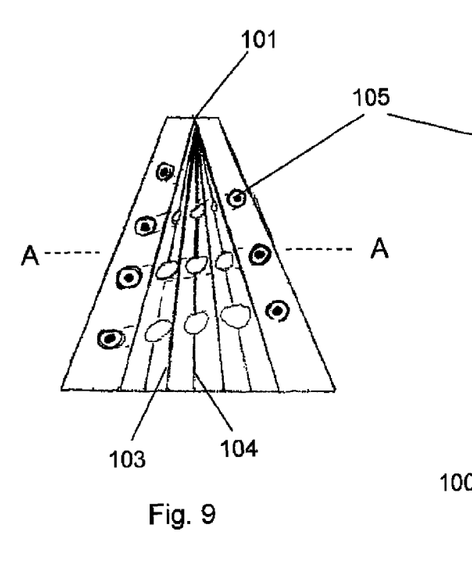
FIG. 9 is a cross-sectional side view of a portion of another embodiment of a pressure-activated valve in a closed position.
Figure 10:
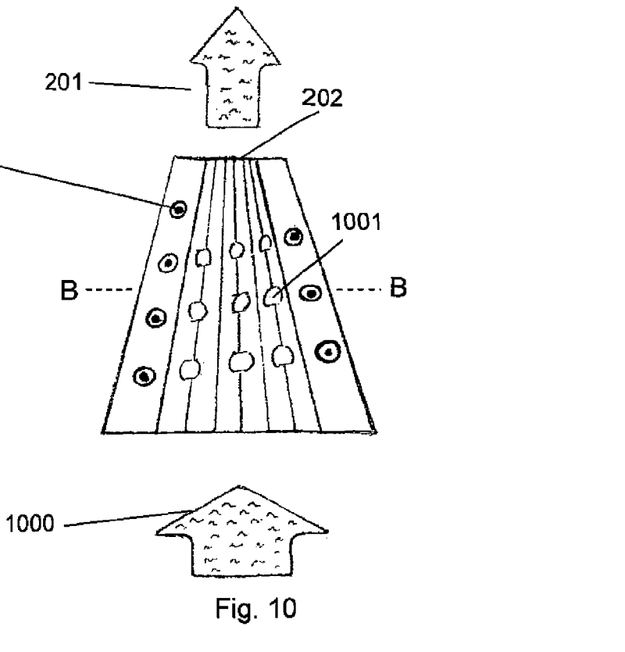
FIG. 10 is a side view of a portion of the pressure-activated valve depicted in FIG. 9 in an open position.

The fingers may be straight or curved, such as in the depicted embodiments where they are all curved in the same manner. Such curvature may allow the biasing mechanism to better employ the tensile strength of the material used to form the fingers. The use of curved fingers, forming a sort of spiral pattern as seen in FIGS. 5 and 7, may also cause the panels to overlap and form a relatively flat surface when the nozzle is in the closed position.

The number of folds to be used in a nozzle can vary from a minimum of 3 up to preferred numbers such as 6, 8, 10, 16, 24 or 40. In general, the larger the number of folds is, the less the depth of each fold is (i.e. the width of each panel at a given point along the longitudinal axis). However, the number of folds is limited by the increasing manufacturing complexity to make the nozzle and biasing mechanism, so it is generally preferred to use no more than 32 folds and preferably no more than 24 or 16.

It is preferred that the width of each panel be equal at the same point along the longitudinal axis so that the star pattern formed by the inner surface of the nozzle in a cross-section parallel to the base plane of the nozzle is radially symmetric.

In addition to the nozzle 1604 and biasing mechanism 1603, FIG. 16 also depicts a container attachment mechanism 1602 and a hard cap 1601. The hard cap 1601 may be used for long-term storage of the container so as to ensure there is no contamination of the liquid 1607 from external gasses or liquids seeping through the closed distal end of the nozzle 1604.

Figure 14:
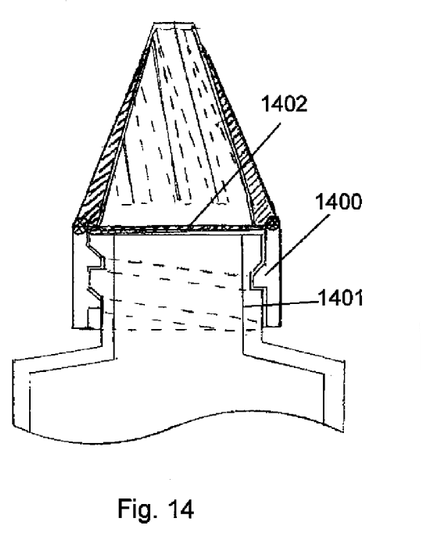
FIG. 14 shows a cross-sectional side view of an embodiment of a pressure-activated valve connected to a container by a threaded container attachment mechanism.
Figure 15:
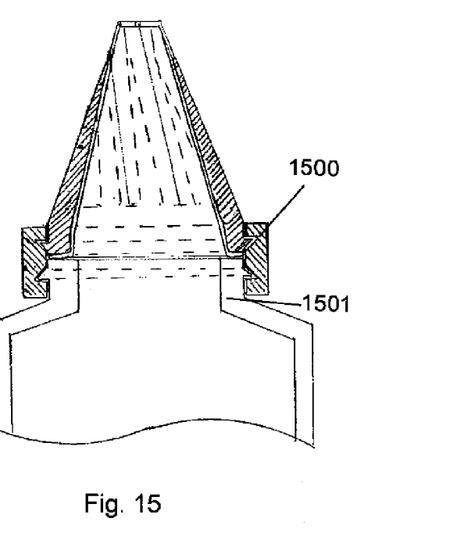
FIG. 15 shows a cross-sectional side view of an embodiment of a pressure-activated valve connected to a container by an alternate container attachment mechanism.

Other variants of suitable container attachment mechanisms are shown as items 1400 and 1500 in FIGS. 14 and 15. In some embodiments, the container attachment mechanism 1400 may be threaded so that it can be screwed onto a suitably adapted container neck 1401. Such an approach makes it easy to remove the nozzle from the container. This is useful, for example, to remove a membrane 1402 sealing the neck of the container 1401 so that tampering may be detected and the contents of the container are kept well isolated from the outside environment prior to removal of the membrane.

The spring and the fingers used to provide the biasing force may be made from any suitable material such as resilient metal or resilient plastic, such as latex. The nozzle may also be made of any suitable material with a soft, flexible polymer preferred. Other material, such as coated paper, may also be used but is not preferred.

Figure 17:
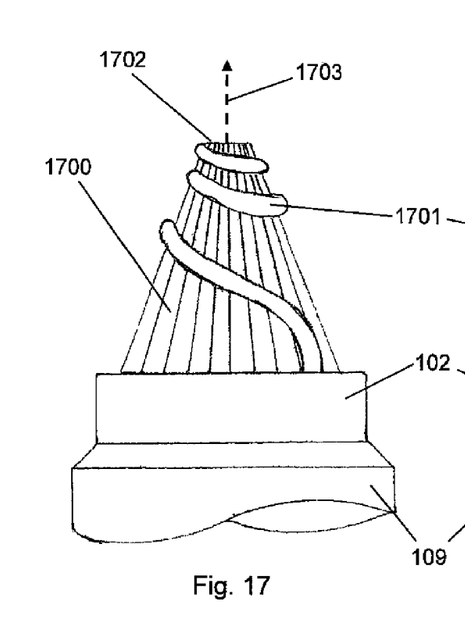
FIG. 17 is a side view of another embodiment of a pressure-activated valve in a closed position.
Figure 18:
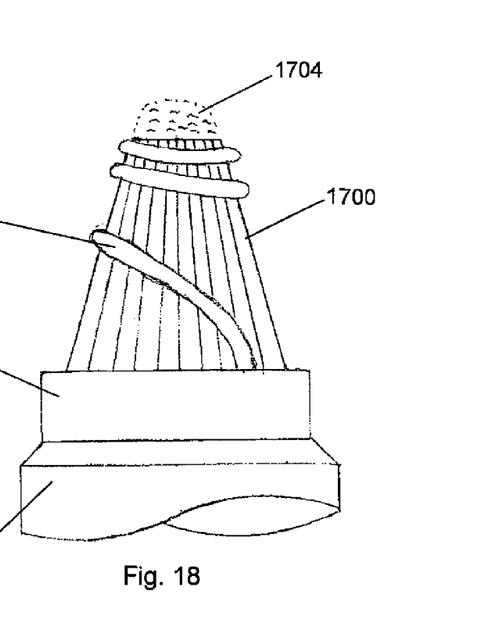
FIG. 18 is a side view of the pressure-activated valve depicted in FIG. 17 in an open position.
Figure 19:
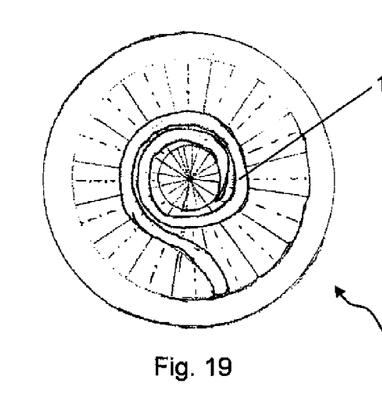
FIG. 19 is a top view of the pressure-activated valve depicted in FIG. 17 in a closed position.
Figure 20:
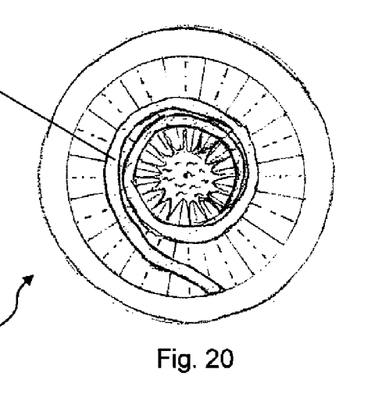
FIG. 20 is a top view of the pressure-activated valve depicted in FIG. 17 in an open position.
Figure 21:
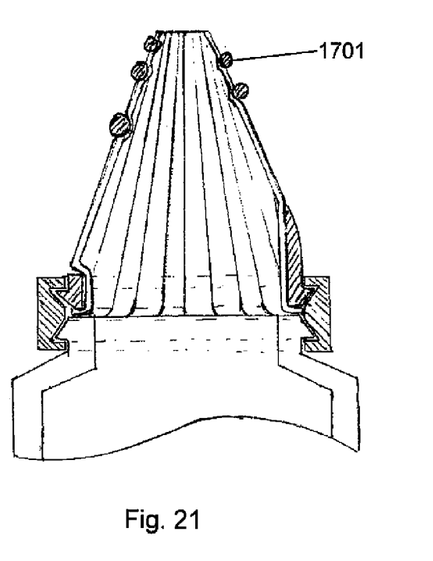
FIG. 21 shows a cross-sectional side view of the pressure-activated valve depicted in FIG. 17 in a closed position and connected to a container.
Figure 22:
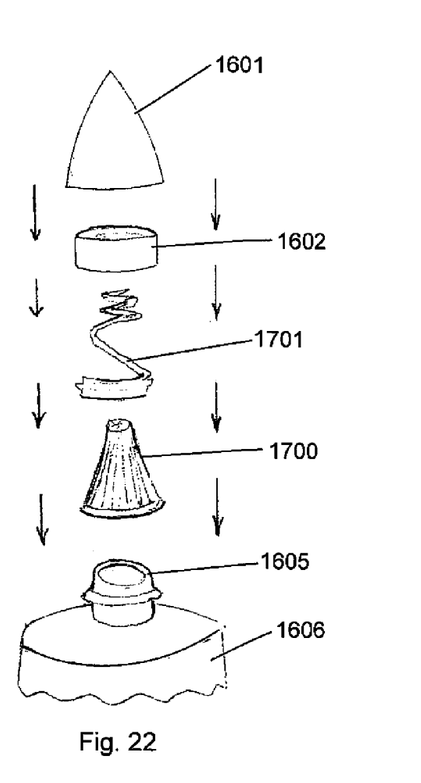
FIG. 22 shows an exploded view of the pressure-activated valve of FIG. 17 including an outer cap and a container attachment mechanism.

An alternate embodiment of the valve is depicted in FIGS. 17-22. In this embodiment, the spring 1701 is spiral and encircles the outside of the nozzle 1700 so that it is maintained in place by friction created by the inward force exerted by the spring 1701, and optionally by connecting the lower end of the spring 1701 to the container attachment mechanism 102. The spring 1701 is designed to exert maximum inward force at portions of the spring 1701 towards the distal end 1702 of the nozzle 1700. FIGS. 17 and 19 depict, respectively, side and top views of the valve in a closed position, and FIGS. 18 and 20 depict, respectively, side and top views of the valve in an open position. To help achieve this, the spring may be formed, as shown in the figures, to encircle the nozzle 1700 more frequently towards the distal end 1702 than towards the proximal end of the nozzle 1700. The valve functions in essentially the same manner as the embodiment of FIG. 1, as described above, except that the spring 1701 directly exerts force on the outer creases of the nozzle 1700, causing the nozzle 1700 to be biased into the closed position. When a user squeezes an attached squeezable container 109 containing a liquid, it causes the liquid in the container 109 to pass into the interior region of the nozzle 1700 and exert pressure outwardly on the nozzle 1700 away from the longitudinal axis 1703, allowing the liquid 1704 to pass out through the distal end of the nozzle 1700.

The helical spring 1701 may be surrounded by a helical tube 105 as described with respect to the embodiment of FIG. 1.

As used herein, a liquid is any composition of matter that, in equilibrium in a particular environment, can flow, irrespective of its viscosity. A liquid may be a pure fluid, such as water, or a suspension. Materials such as peanut butter and finely ground beef are examples of such liquids. A particular environment is defined by factors including the temperature and pressure.

It will be understood by skilled persons that the claimed invention is not limited to employing nozzles formed from a frustoconical piece of material, but, in some embodiments, includes similar shaped pieces of material, where, for example, the proximal end is elliptical, oval or oblate. In other embodiments, the proximal end may be polygonal, such as hexagonal. The shape and folding of the nozzle includes all variants that create a sealed distal end when the inner creases of the folds at the distal end abut each other. Being sealed means that liquid cannot pass between the interior region of the nozzle and the outside unless the nozzle is moved into an open position.

Figure 23:
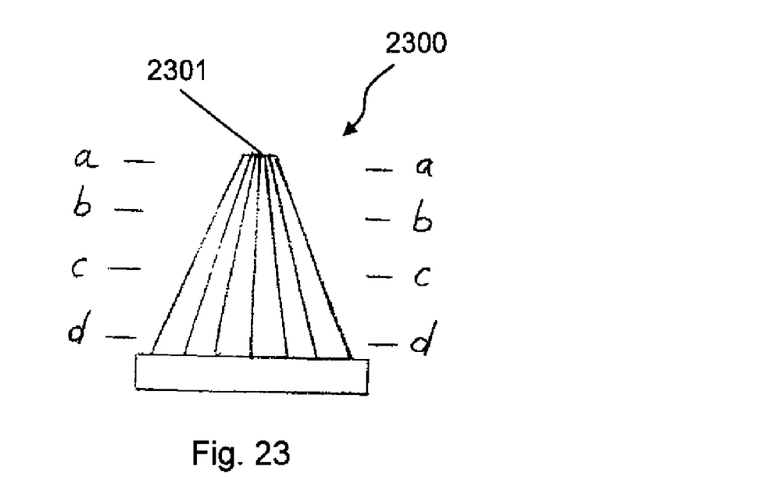
FIG. 23 shows a side view of an embodiment of a pressure-activated valve.
Figures 24A, 24B:
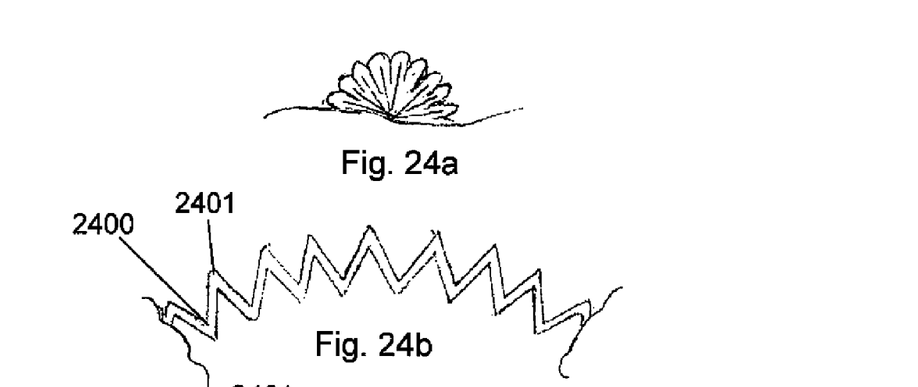
FIGS. 24a, 24b, 24c, and 24d show, respectively, cross-sections of the valve of FIG. 23 through the lines a-a, b-b, c-c, and d-d of FIG. 23.
Figure 24C:
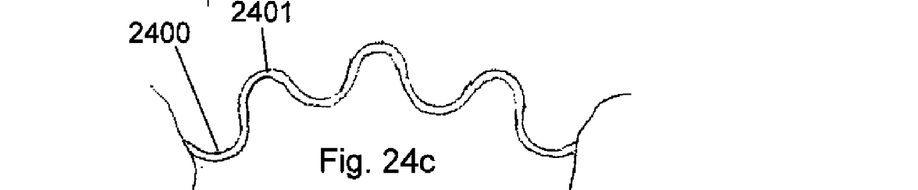
Figure 24D:
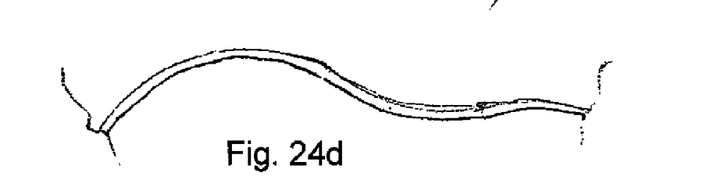

In some embodiments, for use with materials that are particularly sensitive to exposure to the outside environment, rather than coming to a point 2301 as shown in the figures, the top portion of the nozzle may extend further to include a cylindrical portion above the line a-a of FIG. 23, for example, that is closed all along the height of the extended cylindrical portion to provide increased isolation. In such embodiments, the inner creases abut each other along a line in the extended cylindrical portion, which is generally of a length that is relatively small relative to the overall height of the nozzle (e.g. it could be 10-20% of the overall height of the nozzle). Such a design may be referred to as a "dolphin head" design.

The nozzle's proportions may vary based on the application. For example, longer nozzles with smaller radii employing a longer spring may be less expensive to manufacture since the use of a longer spring means that the materials need not be as resilient and so may be less expensive. In contrast, shorter nozzles with larger radii relative to their lengths have the advantage of being more compact, but may require the use of better (more expensive) materials to ensure proper operation.

It should be emphasized that the above-described embodiments of the present invention, particularly, any "preferred" embodiments, are possible examples of implementations, merely set forth for a clear understanding of the principles of the invention. Many variations and modifications may be made to the above-described embodiment(s) of the invention as will be evident to those skilled in the art.

Where, in this document, a list of items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or other similar expressions, is in no way intended to imply that a list is exhaustive. Unless otherwise expressly stated, such lists shall be read to include all comparable or equivalent variations of the items, and alternatives to the items, in the list that a skilled person would understand would be suitable for the purpose that the items are referenced.

The words "comprises" and "comprising", when used in this specification and the claims, are to used to specify the presence of stated features, elements, integers, steps or components, and do not preclude, nor imply the necessity for, the presence or addition of one or more other features, elements, integers, steps, components or groups thereof.

The scope of the claims that follow is not limited by the embodiments set forth in the description. The claims should be given the broadest purposive construction consistent with the description as a whole.

What is claimed is:

1. A pressure-activated valve for dispensing a liquid, the valve comprising
   (a) a dispensing nozzle having an interior region, the nozzle being formed from a frustoconical piece of foldable material having proximal and distal ends, each end having a centre, the nozzle having a longitudinal axis passing through the centres of the proximal and distal ends, the nozzle comprising a plurality of folds extending from the distal end towards the proximal end, each fold having an inner crease, the nozzle having a closed position in which the inner creases abut each other at the distal end so that the liquid cannot pass through the distal end from the interior region, and having open positions in which the inner creases at the distal end are spaced apart from each other to allow the liquid to pass through the distal end from the interior region,
   (b) a biasing mechanism to bias the nozzle into the closed position, and
   (c) a container attachment mechanism attached to the proximal end of the nozzle for attaching the nozzle to a container containing the liquid so that the liquid can pass from the container into the interior region,
   wherein, when the liquid is forced into the interior region under sufficient pressure it causes the nozzle to move from the closed position to one of the open positions so that the liquid flows from the interior region out through the distal end of the nozzle, and when the pressure on the liquid is removed, the biasing mechanism causes the nozzle to move back to the closed position, and wherein each fold further comprises two outer creases, wherein each outer crease is shared with an adjacent fold, the portion of the nozzle situated between each crease being a panel, so that two panels are adjacent to each outer crease.

2. The valve of claim 1, wherein the proximal end of the nozzle forms a circle.

3. The valve of claim 1, wherein the nozzle comprises at least 8 folds.

4. The valve of claim 3, wherein the nozzle comprises at least 16 folds.

5. The valve of claim 3, wherein the nozzle comprises no more than 32 folds.

6. The valve of claim 5, wherein the nozzle comprises no more than 16 folds.

7. The valve of claim 1, wherein the widths of the panels at each point on the longitudinal axis, the width being the distance from the inner crease to the outer crease in a plane parallel to the proximal end of the nozzle passing through the point on the longitudinal axis, are equal.

8. The valve of claim 1, wherein each crease is sharp so that each crease defines a line extending from the distal end of the nozzle to the proximal end of the nozzle, and the panels are flat and pivot around the creases when the nozzle moves between open and closed positions, and the two panels adjacent to each outer crease abut each other at the distal end of the nozzle when the nozzle is in the closed position.

9. The valve of claim 8, wherein the lines defined by the creases are straight.

10. The valve of claim 8, wherein the lines defined by the creases are curved in the same manner.

11. The valve of claim 8, wherein the biasing mechanism comprises a helical spring adapted to pass through one or more openings in each panel, the openings being arranged helically.

12. The valve of claim 11, wherein the spring is disposed within a helical tube, the tube being adapted to pass through the openings in the panels, wherein the tube engages each panel at the one or more openings to form a liquid-tight seal, preventing the liquid in the interior region from passing though the openings.

13. The valve of claim 12, wherein the tube is made of the same material as the nozzle.

14. The valve of claim 1, wherein the biasing mechanism comprises a helical spring adapted to encircle the nozzle so that it exerts pressure on the folds towards the longitudinal axis to bias the nozzle into the closed position.

15. The valve of claim 1, wherein the biasing mechanism comprises a base portion, attached to the proximal end of the nozzle, and a plurality of fingers extending from the base portion, the fingers arranged so that each finger runs along the outside of one of the inner creases to bias the inner crease towards the longitudinal axis, and one finger runs along each inner crease.

16. The valve of claim 15, wherein the base portion and fingers of the biasing mechanism are integrally formed.

17. The valve of claim 15, wherein each crease is sharp so that each crease defines a line extending from the distal end of the nozzle to the proximal end of the nozzle, and the lines defined by the creases are curved in the same manner.

18. A pressure-activated valve for dispensing a liquid, the valve comprising
   (a) a dispensing nozzle having an interior region, the nozzle being formed from a frustoconical piece of foldable material having proximal and distal ends, each end having a centre, the nozzle having a longitudinal axis passing through the centres of the proximal and distal ends, the nozzle comprising a plurality of folds extending from the distal end towards the proximal end, each fold having an inner crease, the nozzle having a closed position in which the inner creases abut each other at the distal end so that the liquid cannot pass through the distal end from the interior region, and having open positions in which the inner creases at the distal end are spaced apart from each other to allow the liquid to pass through the distal end from the interior region,
   (b) a biasing mechanism to bias the nozzle into the closed position, and
   (c) a container attachment mechanism attached to the proximal end of the nozzle for attaching the nozzle to a container containing the liquid so that the liquid can pass from the container into the interior region,
   wherein, when the liquid is forced into the interior region under sufficient pressure it causes the nozzle to move from the closed position to one of the open positions so that the liquid flows from the interior region out through the distal end of the nozzle, and when the pressure on the liquid is removed, the biasing mechanism causes the nozzle to move back to the closed position, and wherein the biasing mechanism comprises a helical spring adapted to encircle the nozzle so that it exerts pressure on the folds towards the longitudinal axis to bias the nozzle into the closed position.

* * * * *